United States Patent [19]

Chatterley

[11] 4,076,264
[45] Feb. 28, 1978

[54] SELF STEERING TRAILER ARRANGEMENT
[75] Inventor: James P. Chatterley, Washington, Mich.
[73] Assignee: General Motors Corporation, Detroit, Mich.
[21] Appl. No.: 732,926
[22] Filed: Oct. 15, 1976
[51] Int. Cl.² .......................... B60D 1/06; B62D 13/06
[52] U.S. Cl. ...................................... 280/81 A; 280/90; 280/460 R; 280/492
[58] Field of Search ..................... 280/81 A, 80 R, 90, 280/95 R, 442, 443, 444, 445, 460 R, 456 R, 63, 492

[56] References Cited
U.S. PATENT DOCUMENTS

| | | | |
|---|---|---|---|
| 1,968,046 | 7/1934 | Linn | 280/460 R X |
| 2,059,975 | 11/1936 | Smith | 280/90 X |
| 2,345,945 | 4/1944 | Miner | 280/442 X |
| 2,582,716 | 1/1952 | Nelson | 280/460 R X |
| 3,291,503 | 12/1966 | DeLay | 280/81 A |
| 3,393,922 | 7/1968 | Adams | 280/443 X |
| 3,716,249 | 2/1973 | Schaeff | 280/81 A |
| 3,883,151 | 5/1975 | Barchus | 280/80 R |

Primary Examiner—Kenneth H. Betts
Attorney, Agent, or Firm—John P. Moran

[57] ABSTRACT

A self steering two-wheel trailer including frame and hitch means for rigidly securing the trailer to a motor vehicle so as to be pivotable relative thereto in the vertical direction only, and adjustable link means pivotally connected between the wheels, the adjustable link means including tie bars axially aligned and interconnected at their inner ends by damper means suitable for responding to road load conditions upon reversing the direction of travel to automatically accommodate pivoting of the wheels to a toe-in attitude in the new direction of movement.

9 Claims, 11 Drawing Figures

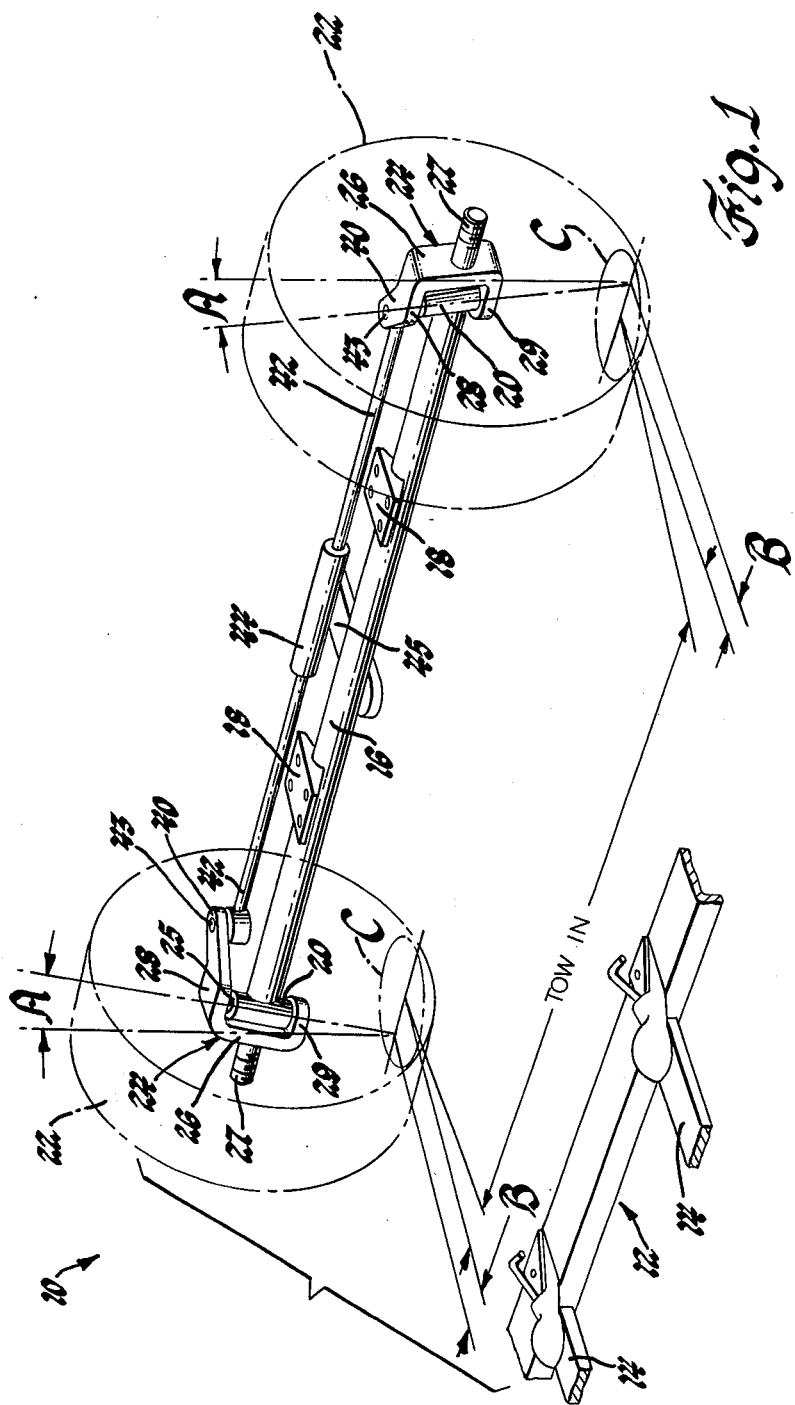
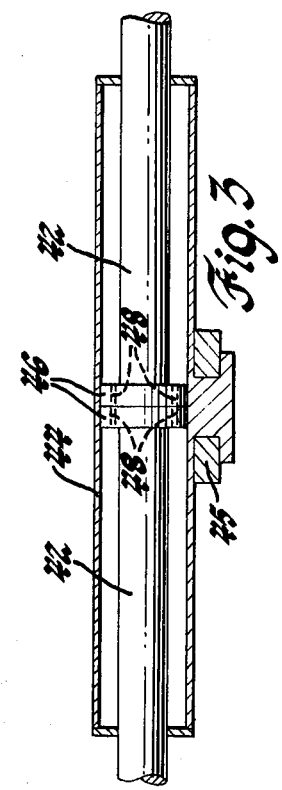
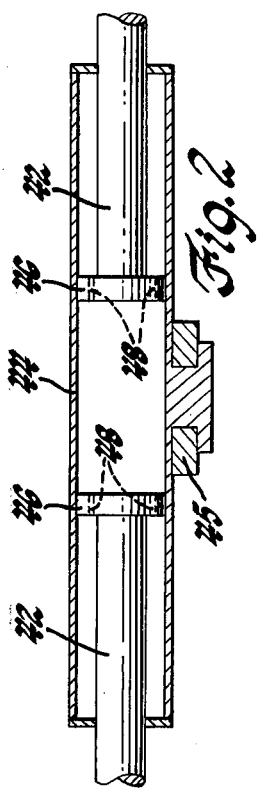

SELF STEERING TRAILER ARRANGEMENT

This invention relates generally to a vehicular trailer construction and, more specifically, to means for automatically guiding the trailer regardless of the direction of travel.

Heretofore, various arrangements have been advocated for use on trailers for automatically shifting the wheel structure each time that the trailer moves in either forward or reverse direction, to thereby induce a change in either toe-in or caster to facilitate traction and maneuverability in the direction of trailer movement. For examples of such arrangements, see Barchus U.S. Pat. No. 3,883,151, Peterson U.S. Pat. No. 2,644,697 and Linn U.S. Pat. No. 1,915,325.

A general object of this invention is to provide a more simplified and economical and equally efficient arrangement than has heretofore been available for responding to road load conditions upon the reversing of the direction of travel of a trailer to automatically accommodate toe-in of the trailer wheels in the new direction of movement.

Another object of the invention is to provide a trailer having (1) frame and hitch means for rigidly securing the trailer to a motor vehicle so as to be pivotable relative thereto in the vertical direction only, and (2) adjustable link means operatively connected between oppositely disposed wheel carriers for accommodating pivoting of the wheels about their respective pivot axes such that the wheels automatically toe-in in the opposite direction upon reversal of their direction of travel.

A further object of the invention is to provide a self steering trailer including a frame having dual spaced hitch means operatively connected to the forward end thereof for rigidly securing the trailer to a motor vehicle so as to be pivotable relative thereto in the vertical direction only, an axle, a pair of oppositely disposed wheel carriers pivotally connected to the respective ends of the axle, a road wheel rotatably mounted on each of the wheel carriers such that the pivot axis of the wheel carrier intersects the road surface a predetermined distance outboard of the centerline of the road wheel, and adjustable link means pivotally connected between the wheel carriers, the adjustable link means including axially aligned tie bars connected at their outer ends to the respective wheel carriers, and suitable damper means interconnecting the inner ends of the tie bars for responding to road load conditions upon the reversing of the direction of travel to accommodate pivoting of the wheels about their respective pivot axes such that the wheels automatically toe-in in the new direction of movement.

These and other objects and advantages of the invention will be apparent when reference is made to the following description and accompanying drawings wherein:

FIG. 1 is a fragmentary perspective view of guidance means for use with a vehicular trailer and embodying the invention;

FIGS. 2 and 3 are enlarged cross-sectional views of a portion of the FIG. 1 structure in different operational conditions;

Figure 4:
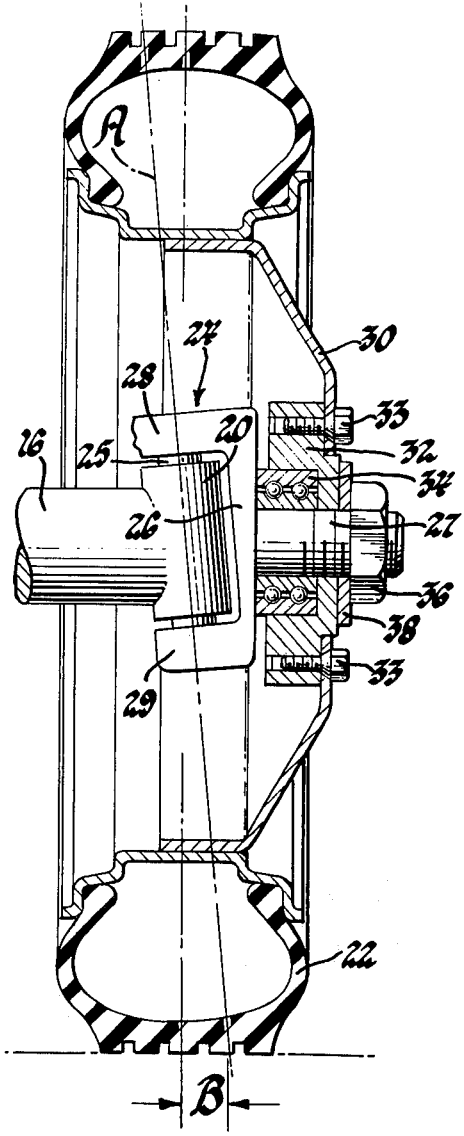
FIGS. 4 and 5 illustrate alternate arrangements for connecting the trailer axle to the wheels.

Referring now to the drawings in greater detail, FIG. 1 illustrates dual-wheel guidance means 10 including, generally, dual spaced frame and hitch means 12 for rigidly securing a trailer to a motor vehicle rear bumper portion represented at 14 so as to be pivotable relative thereto in a vertical direction only, as will be more fully explained. The guidance means 10 also includes an axle 16, support brackets 18 formed at spaced intervals on the upper side of the axle 16 suitable for the mounting thereon of a load carrying means such as a trailer body. A cylindrical mounting member 20 is formed on each end of the axle 16 at a predetermined angle with respect to the axis of the axle for determining a kingpin axis A. It is noted in FIG. 1 that the kingpin axis A is projected at an angle such that intersection of the axis A with the ground surface is a predetermined distance B outward of the center of a typical "so-called" tire patch C, the latter being the area of contact with the ground of tires 22, as illustrated in FIG. 4 and shown in phantom in FIG. 1.

A wheel carrier 24 is pivotally connected by means of a kingpin 25 to each of the cylindrical mounting members 20. More specifically, each wheel carrier 24 includes a vertically oriented member 26 on one side of which a wheel spindle 27 is formed, with upper and lower horizontal arms 28 and 29 extending from the other side thereof, the kingpin 25 being operatively connected between the arms 28 and 29 for extension through the cylindrical mounting member 20. As illustrated in FIG. 4, a wheel 30, on which the tire 22 is mounted, may include an adapter member 32 secured to the wheel by bolts 33 for mounting on suitable bearing means 34 on the spindle 27. A nut 36 and washer 38 serve to secure the adapter member 32 around the bearing means 34.

An extension 40 is formed on each upper arm 28 of the wheel carrier 24, and extended rearwardly of the axle 16. A tie bar 42 is pivotally connected at the distal end thereof by any suitable means, such as a pivot pin 43, to each arm 40 and extended toward one another so as to be axially aligned and slidably mounted at their inner ends in a suitable hydraulic or pneumatic damper unit 44. The damper unit 44 is supported by an arm 45 extending from the axle 16. As illustrated in FIGS. 2 and 3, a piston 46 having suitable apertures 47 is formed on each of the adjacent inner ends of the tie bars 42 for slidable reciprocal operation within the damper unit 44.

Figure 5:
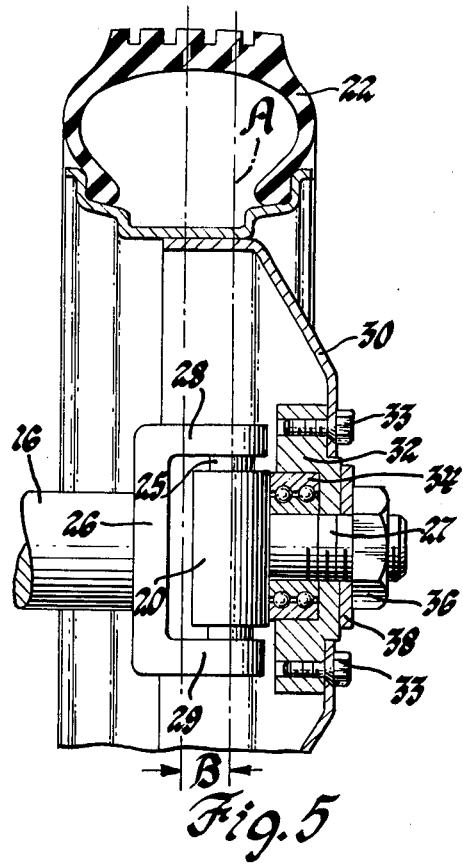
Figure 6:
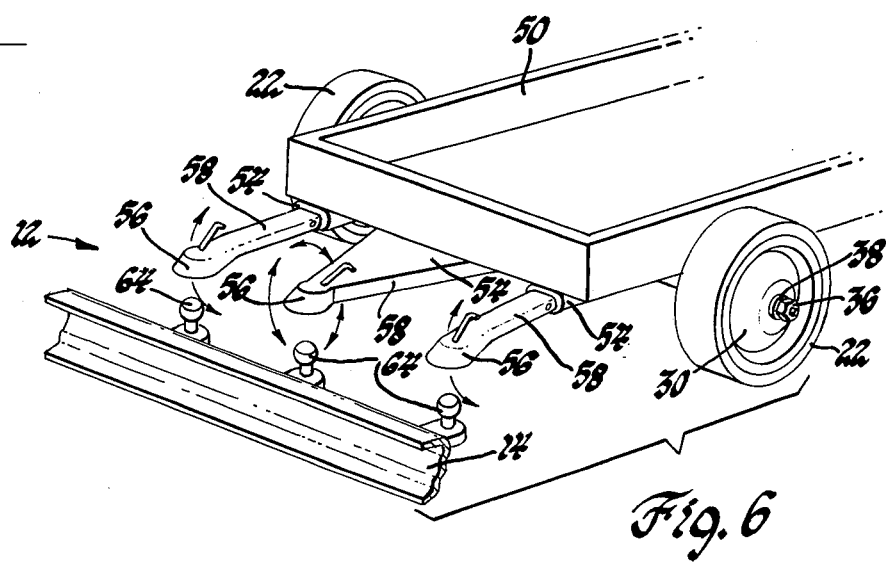
FIGS. 6–11 illustrate various frame and hitch means within the scope of the invention.
Figure 7:
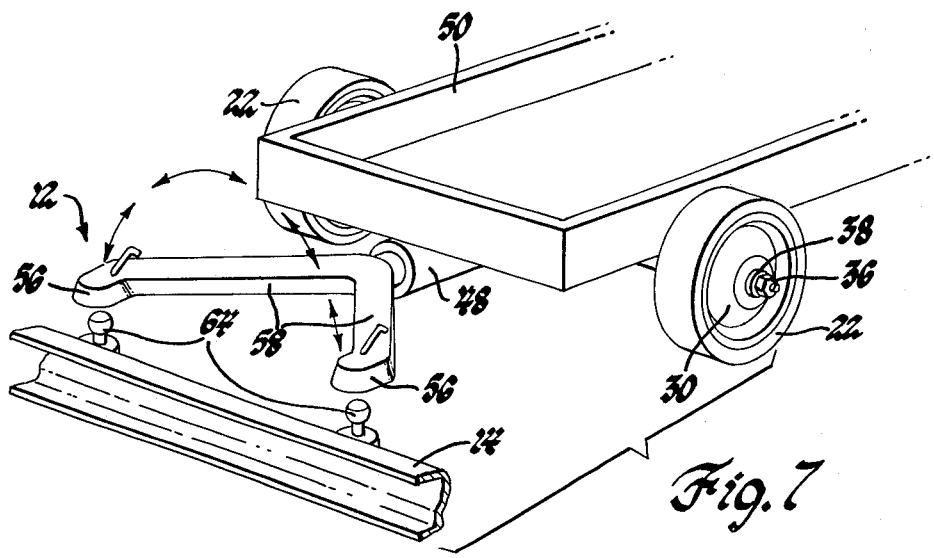
Figure 8:
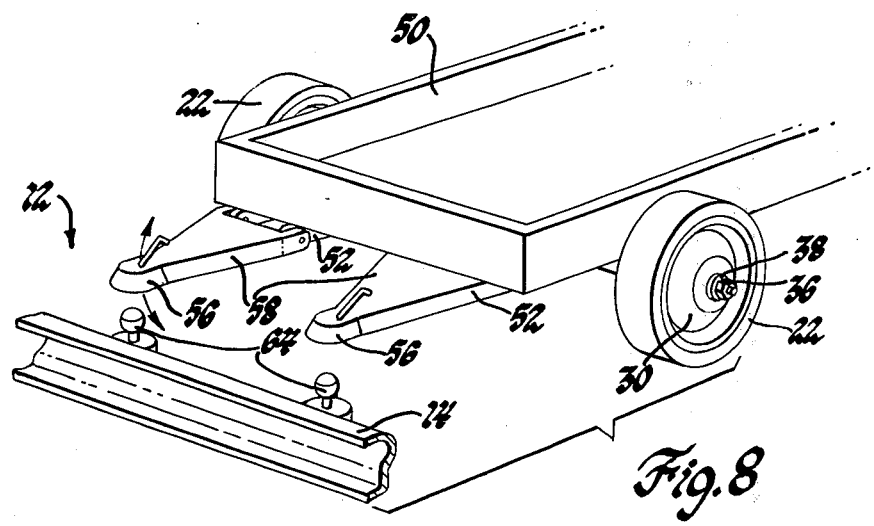
Figure 9:
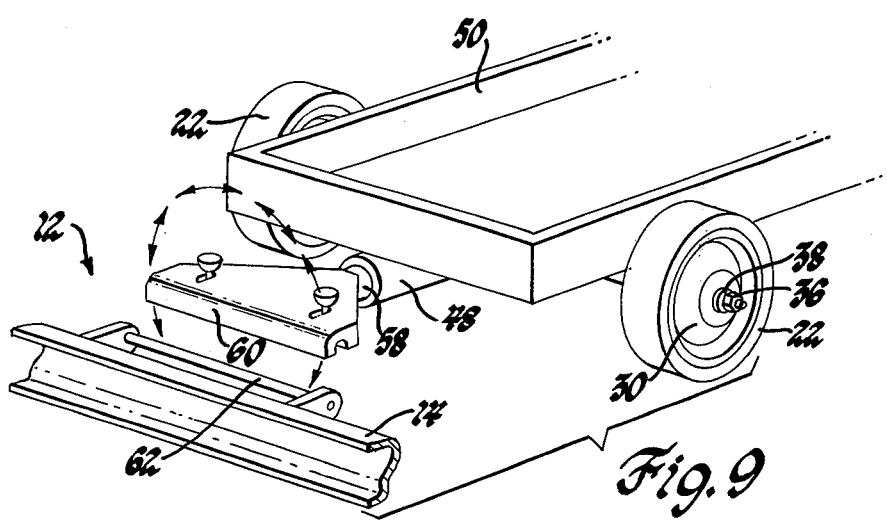
Figure 10:
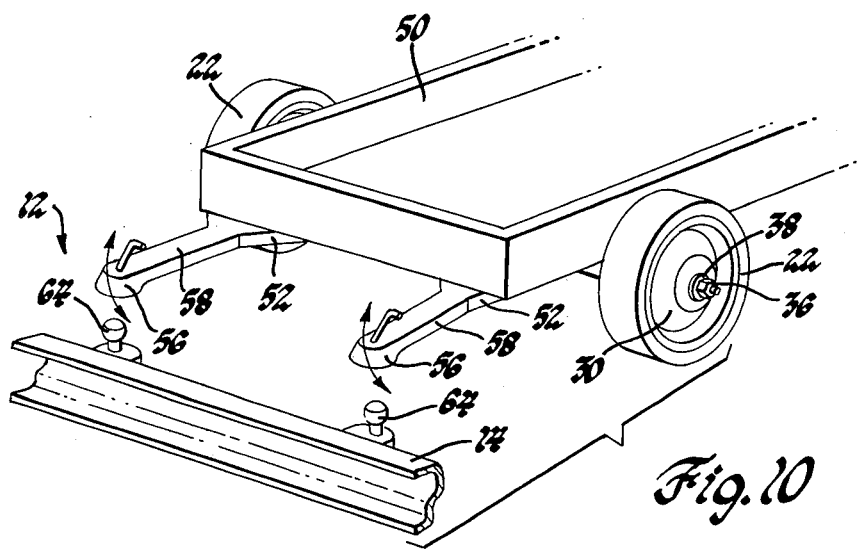

Referring now to FIG. 5, it may be noted that the cylindrical member 20 may be formed on the inner end of the wheel spindle 27 and serve as the wheel carrier, while the vertically oriented member 26 and its associated horizontal arms 28 and 29 may be formed on the end of the axle 16, with the kingpin 25 providing the pivotal connection therebetween. FIG. 5 also illustrates that the kingpin axis A may be vertical, but must be located so as to provide the same outboard distance B with respect to the center of the tire patch C at the ground surface.

Figure 11:
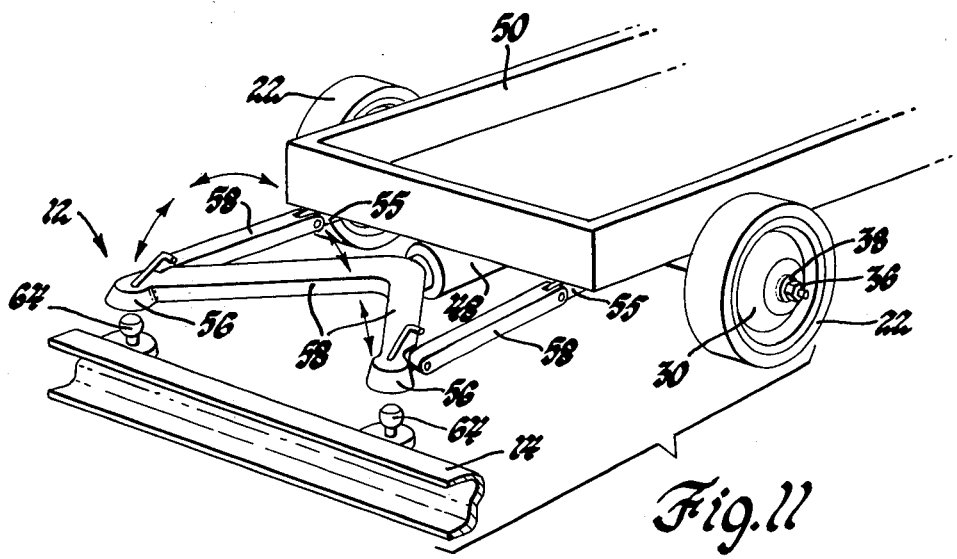

FIGS. 6–11 illustrate different embodiments of the dual spaced frame and hitch means 12 described generally above with respect to FIG. 1. More specifically, the frame hitch means 12 may consist of a singular centrally located tubular frame member 48 (FIGS. 7 and 9) for supporting a trailer body 50 in conjunction with the support brackets 18 described above relative to FIG. 1. If desired, the frame may consist of two oppositely disposed flat members 52 (FIGS. 8 and 10), or three spaced flat members 54 (FIG. 6), or a central tubular member 48 with vertically oriented members 55 on opposite sides thereof (FIG. 11). In each instance, except for the FIG. 9 structure, at least two ball-mounting members 56 are formed at the forward ends of extensions 58 of the respective frame members 48, 52, 54 and 55. In the case of the FIG. 9 structure, a bar-mounting member 60 is formed on the extension 58. The bar-mounting member 60 may be such that it mounts on a bar hitch 62 secured to the vehicular rear bumper 14. In the case of the FIGS. 6–8, 10 and 11 arrangements, at least two spaced typical ball hitches 64 are secured in any suitable manner to the rear bumper 14.

It is apparent that with the above described hitch arrangement, movement of the trailer in a lateral direction is prevented. Movement of the trailer in a vertical direction is obtained by the rotation of each ball-mounting member 56 on the respective ball hitches 64 in FIG. 10, by virtue of one or two extensions 58 of the FIGS. 8 and 6 arrangements being pivotally mounted on the respective frame members 52 and 54, or by virtue of the extensions 58 being pivotally mounted in the singular frame members 48 of the FIGS. 7 and 9 arrangements. The FIG. 11 construction illustrates both the pivotal and rotational variations of mounting the extensions 58 on the respective frame members 48 and 55.

In operation, once the vehicle represented by the rear bumper portion 14 is reversed in its direction of travel, it is apparent from the above description of the FIGS. 6–11 hitch arrangements that the trailer 50 is incapable of jack-knifing, but, rather, will remain longitudinally aligned with the driving vehicle. Referring now to FIGS. 1–3, it may be noted that, by virtue of the kingpin axis A intersecting the ground surface a distance B outwardly of the center of the tire patch C, the wheels 30 and their associated tires 22 will automatically pivot about the axis A from a forward toed-in condition to a rearward toed-in condition, in response to the shifting of the direction of travel of the vehicle from forward to reverse.

It should be apparent that the invention provides a simplified, economical and efficient means for achieving a reversal of the toe-in condition for trailer wheels automatically upon the reversing of the direction of travel.

While various embodiments of the invention have been shown and described, still other modifications thereof are possible.

What is claimed is:

1. For use with a motor vehicle, a self steering trailer comprising frame means, hitch means operatively connected to the forward end of said frame means for securing said trailer to said motor vehicle so as to be pivotable relative thereto in the vertical direction only, an axle, a trailer body mounted on said axle and secured to said frame means, a pair of oppositely disposed wheel carriers pivotally connected to the respective ends of said axle, a road wheel rotatably mounted on each of said wheel carriers such that the pivot axis of said wheel carrier intersects the road surface a predetermined distance outboard of the centerline of said road wheel, and adjustable link means pivotally connected between said wheel carriers, said adjustable link means including aligned tie bars pivotally connected at the outer ends thereof to said respective wheel carriers, and damper means operatively interconnecting the inner ends of said tie bars for responding to road load conditions upon the reversing of direction of travel to accommodate pivoting of said wheels about said pivot axis such that said wheels automatically toe-in in the new direction of movement of said motor vehicle.

2. For use with a motor vehicle, a self steering trailer comprising frame means, dual hitch means operatively connected to the forward end of said frame means for securing said trailer to said motor vehicle so as to be pivotable relative thereto in the vertical direction only, an axle, support means formed on said axle, a trailer body mounted on said support means and on said frame means, a pair of oppositely disposed wheel carriers pivotally connected to the respective ends of said axle, a road wheel rotatably mounted on each of said wheel carriers such that the pivot axis of said wheel carrier intersects the road surface a predetermined distance outboard of the centerline of said road wheel, and an adjustable link pivotally connected between said wheel carriers, said adjustable link including aligned tie bars pivotally connected at the outer ends thereof to said respective wheel carriers, a piston formed on the inner end of each of said tie bars, and a damper unit adapted to having said pistons slidably mounted therein for responding to road load conditions upon the reversing of direction of travel to accommodate pivoting of said wheels about said pivot axis such that said wheels automatically toe-in in the new direction of movement of said motor vehicle.

3. For use with a motor vehicle having dual spaced ball hitches formed on the rear bumper portion thereof, a self steering trailer comprising an axle, support means formed on said axle, a trailer body mounted on said support means, a tubular frame member located beneath the center of the forward end of said trailer body, a Y-shaped extension rotatably connected to said tubular frame member, two ball hitch receptacle members formed on the distal ends of said Y-shaped extension for securing said trailer to said motor vehicle so as to be pivotable about said ball hitches in the vertical direction only, a pair of oppositely disposed wheel carriers pivotally connected to the respective ends of said axle, a road wheel rotatably mounted on each of said wheel carriers such that the pivot axis of said wheel carrier intersects the road surface a predetermined distance outboard of the centerline of said road wheel, and an adjustable link pivotally connected between said wheel carriers, said adjustable link including aligned tie bars pivotally connected at the outer ends thereof to said respective wheel carriers, a piston formed on the inner end of each of said tie bars, and a damper unit adapted to having said pistons slidably mounted therein for responding to road load conditions upon the reversing of direction of travel to accommodate pivoting of said wheels about said pivot axis such that said wheels automatically toe-in in the new direction of movement of said motor vehicle.

4. For use with a motor vehicle having dual spaced ball hitches formed on the rear bumper portion thereof, a self steering trailer comprising an axle, support means formed on said axle, a trailer body mounted on said support means, a pair of frame members secured adjacent opposite forward corners of said trailer body and having a portion thereof extending forwardly therefrom, a ball hitch receptacle member formed on the distal end of each of said frame members for securing said trailer to said motor vehicle so as to be pivotable about said ball hitches in the vertical direction only, a pair of oppositely disposed wheel carriers pivotally connected to the respective ends of said axle, a road wheel rotatably mounted on each of said wheel carriers such that the pivot axis of said wheel carrier intersects the road surface a predetermined distance outboard of the centerline of said road wheel, and an adjustable link pivotally connected between said wheel carriers, said adjustable link including aligned tie bars pivotally connected at the outer ends thereof to said respective wheel carriers, and a piston formed on the inner end of each of said tie bars, and a damper unit adapted to having said pistons slidably mounted therein for responding to road load conditions upon the reversing of direction of travel to accommodate pivoting of said wheels about said pivot axis such that said wheels automatically toe-in in the new direction of movement of said motor vehicle.

5. For use with a motor vehicle having dual spaced ball hitches formed on the rear bumper portion thereof, a self steering trailer comprising an axle, support means formed on said axle, a trailer body mounted on said support means, a pair of frame members secured adjacent opposite forward corners of said trailer body and having a portion thereof extended forwardly therefrom, at least one of said extended portions of said frame members being pivotable in the vertical direction, a ball hitch receptacle member formed on the distal end of each of said frame members for securing said trailer to said motor vehicle so as to be pivotable about said ball hitches in the vertical direction only, a pair of oppositely disposed wheel carriers pivotally connected to the respective ends of said axle, a road wheel rotatably mounted on each of said wheel carriers such that the pivot axis of said wheel carrier intersects the road surface a predetermined distance outboard of the centerline of said road wheel, and an adjustable link pivotally connected between said wheel carriers, said adjustable link including aligned tie bars pivotally connected at the outer ends thereof to said respective wheel carriers, a piston formed on the inner end of each of said tie bars, and a damper unit adapted to having said pistons slidably mounted therein for responding to road load conditions upon the reversing of direction of travel to accommodate pivoting of said wheels about said pivot axis such that said wheels automatically toe-in in the new direction of movement of said motor vehicle.

6. For use with a motor vehicle having dual spaced ball hitches formed on the rear bumper portion thereof, a self steering trailer comprising an axle, support means formed on said axle, a trailer body mounted on said support means, a tubular frame member located beneath the center of the forward end of said trailer body, a pair of frame members pivotally secured in the vertical direction adjacent opposite forward corners of said trailer body, a Y-shaped extension rotatably connected to said tubular frame member, two ball hitch receptacle members formed on the distal ends of said Y-shaped extension, said extended portions of said pair of frame members being pivotally connected to said Y-shaped extension adjacent said ball hitch receptacle members for securing said trailer to said motor vehicle so as to be pivotable about said ball hitches in the vertical direction only, a pair of oppositely disposed wheel carriers pivotally connected to the respective ends of said axle, a road wheel rotatably mounted on each of said wheel carriers such that the pivot axis of said wheel carrier intersects the road surface a predetermined distance outboard of the centerline of said road wheel, and an adjustable link pivotally connected between said wheel carriers, said adjustable link including aligned tie bars connected at the outer ends thereof to said respective wheel carriers, a piston formed on the inner end of each of said tie bars, and a damper unit adapted to having said piston slidably mounted therein for responding to road load conditions upon the reversing of direction of travel to accommodate pivoting of said wheels about said pivot axis such that said wheels automatically toe-in in the new direction of movement of said motor vehicle.

7. For use with a motor vehicle having a bar mounted behind and parallel to the rear bumper portion thereof, a self steering trailer comprising an axle, support means formed on said axle, a trailer body mounted on said support means, a tubular frame member located beneath the center of the forward end of said trailer body, a transversely slotted connector member rotatably connected at the rear end thereof to said tubular frame member and secured at the forward end thereof to said bar, thereby securing said trailer to said motor vehicle so as to be pivotable about the axis of said tubular frame member only, a pair of oppositely disposed wheel carriers pivotally connected to the respective ends of said axle, a road wheel rotatably mounted on each of said wheel carriers such that the pivot axis of said wheel carrier intersects the road surface a predetermined distance outboard of the centerline of said road wheel, and an adjustable link pivotally connected between said wheel carriers, said adjustable link including aligned tie bars connected at the outer ends thereof to said respective wheel carriers, a piston formed on the inner end of each of said tie bars, and a damper unit adapted to having said pistons slidably mounted therein for responding to road load conditions upon the reversing of direction of travel to accommodate pivoting of said wheels about said pivot axis such that said wheels automatically toe-in in the new direction of movement of said motor vehicle.

8. For use with a motor vehicle, a self steering trailer comprising frame means, dual hitch means operatively connected to the forward end of said frame means for securing said trailer to said motor vehicle so as to be pivotable relative thereto in the vertical direction only, an axle having a cylindrical member formed on each end thereof, support means formed at intermediate points along said axle, a trailer body mounted on said support means and on said frame means, a pair of oppositely disposed wheel carriers each having upper and lower horizontal arms for spanning said cylindrical member; a kingpin secured to said arms and pivotally extended through said cylindrical member, a spindle extending outwardly from a vertical portion of each of said carriers, a road wheel and tire rotatably mounted on each of said spindles, the intersection of said tire with the road surface forming a tire patch area, said cylindrical member being positioned such that the axis thereof intersects the road surface a predetermined distance outboard of the center of said tire patch area, and an adjustable link pivotally connected between one of said upper and lower sets of horizontal arms, said adjustable link including aligned tie bars pivotally connected at the outer ends thereof to said arms, a piston formed on the inner end of each of said tie bars, and a damper unit adapted to having said pistons slidably mounted therein for responding to road load conditions upon the reversing of direction of travel to accommodate pivoting of said wheels about said pivot axis such that said wheels automatically toe-in in the new direction of movement of said motor vehicle.

9. For use with a motor vehicle, a self steering trailer comprising frame means, dual hitch means operatively connected to the forward end of said frame means for securing said trailer to said motor vehicle so as to be pivotable relative thereto in the vertical direction only, an axle having a vertical member with upper and lower horizontal arms extending outwardly therefrom, support means formed at intermediate points along said axle, a trailer body mounted on said support means and on said frame means, a pair of oppositely disposed vertically oriented cylindrical wheel carriers, each mounted between the respective upper and lower horizontal arms, a kingpin secured to said arms and pivotally extended through said cylindrical wheel carrier, a spindle extending outwardly from a central side portion of each of said cylindrical wheel carriers, a road wheel and tire rotatably mounted on each of said spindles, the intersection of said tire with the road surface forming a tire patch area, said cylindrical member being positioned such that the axis thereof intersects the road surface a predetermined distance outboard of the center of said tire patch area, and an adjustable link pivotally connected between one of said upper and lower sets of horizontal arms, said adjustable link including aligned tie bars pivotally connected at the outer ends thereof to said arms, a piston formed on the inner end of each of said tie bars, and a damper unit adapted to having said pistons slidably mounted therein for responding to road load conditions upon the reversing of direction of travel to accommodate pivoting of said wheels about said pivot axis such that said wheels automatically toe-in in the new direction of movement of said motor vehicle.

* * * * *